US007365236B2

(12) United States Patent
Catallo

(10) Patent No.: US 7,365,236 B2
(45) Date of Patent: Apr. 29, 2008

(54) GENERATION OF A CREOSOTE-LIKE MIXTURE, OR RECOVERY OF METALS, OR BOTH FROM PRESERVED WOOD BY REACTION IN SUPERCRITICAL WATER

(75) Inventor: W. James Catallo, Baton Rouge, LA (US)

(73) Assignee: Board of Supervisors of Louisiana State University and Agricultural and Mechanical College, Baton Rouge, LA (US)

( * ) Notice: Subject to any disclaimer, the term of this patent is extended or adjusted under 35 U.S.C. 154(b) by 996 days.

(21) Appl. No.: 10/289,731

(22) Filed: Nov. 7, 2002

(65) Prior Publication Data

US 2004/0092782 A1 May 13, 2004

(51) Int. Cl.
*B05D 3/04* (2006.01)
(52) U.S. Cl. .................. 585/16; 585/242; 427/378; 204/157.15
(58) Field of Classification Search ........... 204/157.15; 427/378; 585/16, 242
See application file for complete search history.

(56) References Cited

U.S. PATENT DOCUMENTS

| | | | |
|---|---|---|---|
| 5,364,475 A | 11/1994 | Levien et al. | 134/42 |
| 5,476,975 A | 12/1995 | Ruddick et al. | 568/762 |
| 5,516,952 A | 5/1996 | Lee et al. | 585/241 |
| 5,698,829 A * | 12/1997 | Ruddick et al. | 204/157.15 |
| 5,830,763 A | 11/1998 | Junk et al. | 436/56 |
| 6,001,256 A | 12/1999 | Hawthorne et al. | 210/643 |
| 6,180,845 B1 | 1/2001 | Catallo et al. | 585/240 |
| 6,923,917 B1 * | 8/2005 | Hughes | 210/702 |

OTHER PUBLICATIONS

Patricia-Ann Tom, Managing Editor, Waste Age, Special Report, CCA Treated Wood, Poison Wood, Aug. 9, 2001, pp. 1-9.*
Byerly, Mark S., 1989 Food Processing Waste Conference, Environmental Sciences and Technology Division, Georgia Tech Research Institute, Nov. 6-8, 1989, pp. 260-268, Atlanta, GA.*
Overcash, M. R., and Pal, D., Characterization and Land Application of Seafood Industry Waste Waters, Water Resources Research Institute, University of North Carolina, Raleigh, NC, pp. 1-33, Aug. 1980.*
Shotyk, W., University of Berne, Switzerland, Natural and Anthropogenic Enrichments of As, Cu, Pb, Sb, and Zn in Ombrotrophic versus Minerotrophic Peat Bog Profiles, Jura Mountains, Switzerland, Water, Air and Soil Pollution, vol. 90, No. 3-4, pp. 375-406, 1996. (Abstract only).*

(Continued)

*Primary Examiner*—Glenn Caldarola
*Assistant Examiner*—Prem C. Singh
(74) *Attorney, Agent, or Firm*—John H. Runnels; Bonnie J. Davis

(57) ABSTRACT

An environmentally-friendly method is disclosed for transforming preserved wood, for example creosote-treated or CCA-treated wood with supercritical water. The product of treating weathered creosote-treated wood is a mixture that is similar to fresh creosote. The novel system is akin to a closed-loop system for recovering and rejuvenating creosote. In another aspect of the invention, acidic supercritical water is used to extract copper, chromium, and arsenic from CCA-treated wood, or more generally, to extract metals from an organic matrix.

14 Claims, 4 Drawing Sheets

OTHER PUBLICATIONS

Junk, T. et al. "Synthesis in superheated aqueous media: preparation of fully deuterated pyrazoles and quinoxalines," *Tetr. Lett.*, vol. 38, No. 36, pp. 6309-6312 (1997).

Junk, T. et al., "Hydrogen isotope exchange reactions involving C-H (D, T)," *Chem. Soc. Rev.*, vol. 26, pp. 401-405 (1997).

Junk, T. et al., "Preparative supercritical deuterium exhange in arenes and heteroarenes," *Tetr. Lett.*, vol. 37, No. 20, pp. 3445-3448 (1996).

Junk, T. et al., "Synthesis of polydeuterated benzothiazoles via supercritical deuteration of anilines," *J. Labelled Compounds and Radiopharmaceuticals*, vol. 39, pp. 625-630 (1997).

Kumar, S. et al., "Effect of fatty acid removal on treatability of Douglas fir," International Research Group on Wood Preservation, Section 4, IRG Secretariat (Stockholm), Document No. IRG/WP (93-40008) (1992?—undated).

Portier, R. et al., "Recovery of wood fiber from treated wood products by combined physical, chemical, and biological approaches," undated manuscript (199__?).

Rostad, C. et al., "Bonded-phase extraction column isolation of organic compounds in groundwater at a hazardous waste site," *Anal. Chem.*, vol. 56, pp. 2856-2860 (1984).

Zapf-Gilje, R. et al., "Overview of the remediation process at sites with creosote related contamination in soil, groundwater and river sediment," *Can. J. Civ. Eng.*, vol. 28 (Suppl. 1), pp. 141-154 (2001).

W. Shotyk, "Natural and anthropogenic enrichments of As, Cu, Pb, Sb, and Zn in ombrotrophic versus minerotrophic peat bog profiles, Jura Mountains, Switzerland," *Water, Air, and Soil Pollution*, vol. 90, pp. 375-405 (1996).

Acda, M. et al., "Decay resistance of composites following supercritical fluid impregnation with tebuconazole," *Material und Organismen*, vol. 30, pp. 293-300, 1996.

Acda, M. et al., "Effect of process variables on supercritical fluid impregnation of composites with tebuconazole," *Wood and Fiber Sci.*, vol. 29, pp. 282-290 (1997).

Catallo, W., "Transformation of N-, O-, and S-heterocycles (NOSHs) in estuarine sediments: Effects of redox potential and sediment particle size," *Chemosphere*, vol. 33, pp. 2543-2563 (1996).

Catallo, W., "Effects of hydrological conditions on biogeochemical processes and organic pollutant degradation in salt marsh sediments," pp. 30-38 in M. Holland et al. (Eds.), *Proceedings of a Conference on Sustainability of Wetlands and Water Resources* (Asheville, NC 2002).

Catallo, W. and T. Shupe, "Comprehensive Hydrothermal Treatment of Creosote-Impregnated Wood" (accepted for publication in *Wood and Fiber Science*, 2003).

Cooper, P., "Management of used poles removed from service," *Proc. Second Southeastern Pole Conference*, pp. 102-112 (Jan. 22-25, 1996).

Cooper, P. et al., "Residual CCA levels in CCA-treated poles removed from services," *Solid Wood Prod.*, vol. 51, No. 10, pp. 58-62 (2001).

Demessie, E. et al.., "Supercritical carbon dioxide treatment: Effect of permeability of Douglas-fir heartwood," *Wood and Fiber Sci.*, vol. 27, pp. 296-300 (1995).

Falk, B., "Wood recycling," *Forest Prod. J.*, vol. 47, No. 6, pp. 17-22 (1997).

Felton, C. et al., "The recycling potential of preservative-treated wood," *Forest Prod. J..*, vol. 46, No. 7/8, pp. 37-46 (1996).

Freeman, M. et al., "Pilot-scale toxics R&D assessment of creosote-treated and PCP-treated wood cofiring for pulverized coal utility boiler applications," *Biomass & Bioenergy*, vol. 19, pp. 447-456 (2000).

\* cited by examiner

GENERATION OF A CREOSOTE-LIKE MIXTURE, OR RECOVERY OF METALS, OR BOTH FROM PRESERVED WOOD BY REACTION IN SUPERCRITICAL WATER

This invention pertains to a method for transforming preserved wood by reaction with water under hypoxic, anoxic, or electrochemically reductive supercritical conditions.

Creosote, CAS #8001-58-9, a high boiling point coal or petroleum distillate, is widely used, either alone or in conjunction with chlorinated chemicals and metals, as a wood preservative—for example, in utility poles, marine pilings, railroad ties, and many other uses. Creosote is a complex mixture of many different chemical compounds (hundreds or even thousands of compounds). Creosote is typically prepared as a high-temperature distillation product from coal tar, although it can also be produced from petroleum. Creosote is a thick, oily liquid that is typically amber to black in color. "Creosote" is a generic term, and does not imply a single, unique composition. Different creosotes may have different components, or different proportions of components.

Creosote contains hydrocarbons, condensed aromatic ring compounds, and phenolics. Major components of creosote that can cause harmful health effects are polycyclic aromatic hydrocarbons, N—O—S heterocycles, phenolics, and cresols. Some components of creosote are essentially insoluble in water, while other components are at least somewhat water-soluble (depending on pH). Creosote components dissolved in water can move through soil, where they sometimes enter groundwater. In either groundwater or soil these components may persist in the environment for long periods of time.

It has been reported that in 1997, for example, some $2.76 \times 10^6$ m$^3$ ($97.4 \times 10^6$ ft$^3$) of wood was treated with $292 \times 10^6$ L ($77.2 \times 10^6$ gallons) of creosote, along with $17.7 \times 10^6$ L ($4.7 \times 10^6$ gallons) of petroleum solvent. It has also been estimated that approximately 581 million cubic feet ($16.5 \times 10^6$ m$^3$) of waterborne-preservative-treated wood (nearly all of which was treated with chromated copper arsenate, or CCA) were produced that year. It has been estimated that approximately $2 \times 10^6$ m$^3$ ($70.6 \times 10^6$ ft$^3$) of creosote-treated wood is taken out of service each year in the U.S., and that this total will grow to approximately $16 \times 10^6$ m$^3$ ($565 \times 10^6$ ft$^3$) in 2020. Only a small fraction of weathered utility poles treated with creosote are currently recycled in any manner.

Waste wood products containing creosote are typically designated as both solid waste (e.g., wood, other building material), and as hazardous (chemical) waste, and therefore frequently require special handling. Waste wood products with creosote contain residual aromatic hydrocarbons (AHs), polycyclic aromatic hydrocarbons (PAHs), and N—, O—, S— heterocycles (NOSHs). Many of these compounds are toxic or carcinogenic, and can be mobile in the environment. Leachates containing mutagenic NOSHs and related compounds have been reported from creosote-containing landfills. Components from creosote may leach into the soil, especially under anoxic or acidic conditions, in some cases promoted by microbiological processes.

Prior approaches to treating decommissioned creosote-containing wood have included incineration, land-filling, steam extraction, and biological treatment. Each of these approaches has achieved only limited success in eliminating or recovering the major components of creosote, and each has associated environmental problems.

Chromated copper arsenate (CCA) is the leading treatment for preserving ("pressure treating") wood in the United States. The components of CCA-treated wood are toxics, particularly chromium VI and arsenic. Thus spent CCA-treated wood is a hazardous material. There are no wholly satisfactory prior methods for recovering the metals from CCA-treated wood. Prior methods for recovering such metals have included extraction with supercritical carbon dioxide, or supercritical carbon dioxide with a methanol co-solvent.

There is an ongoing, unfilled need for methods to efficiently and economically recycle treated wood, included both creosote-treated and CCA-treated materials.

The "traditional" phases of matter include solids, liquids, gases, and perhaps plasmas. However, several other phases of matter also exist. For example, above a compound's so-called "critical point" (i.e., above a characteristic critical pressure and critical temperature), the distinction between liquid and gas phases vanishes, and instead there is a single "supercritical" fluid phase with unique properties. The critical temperature for pure water is 374.2° C., and the critical pressure is 221 bar.

Supercritical (SC) water has been used for a variety of synthetic and transformation purposes. See T. Junk et al., "Preparative supercritical deuterium exchange in arenes and heteroarenes," *Tetr. Lett.*, vol. 37, no. 20, pp. 3445-3448 (1996); T. Junk et al., "Synthesis of polydeuterated benzothiazoles via supercritical deuteration of anilines," *J. Labelled Comp. Radiopharm.*, vol. XXXIX, no. 8, pp. 625-630 (1997); T. Junk et al. "Hydrogen isotope exchange reactions involving C-H (D, T) bonds," *Chem. Soc. Rev.*, vol. 26, pp. 401-405 (1997); and T. Junk et al. "Synthesis in superheated aqueous media: preparation of fully deuterated pyrazoles and quinoxalines," *Tetr. Lett.*, vol. 38, no. 36, pp. 6309-6312 (1997).

The supercritical phase is one of the most energetic and chemically dynamic conditions known for aqueous systems. For example, 3/8" stainless steel (316 SS) reactors rated far above 374° C./221 bar corrode and rupture after only a few hours exposure to supercritical water. Borosilicate glass, aluminum, and some plastics (e.g., Teflon™) dissolve or degrade rapidly in SC water. Further, many metal ions and organic chemicals that have low solubility in water at room temperature are almost infinitely soluble in SC water, and are thereby made available for homogeneous and heterogeneous chemical reactions in situ. Of greater interest than its corrosiveness and its ability to solvate normally insoluble compounds is the fact that a supercritical water phase vastly facilitates and promotes a wide range of organic chemical reactions without the need for added catalysts or reagents, reactions including trans-halogenation, de-halogenation, adduction, aromatic proton exchange, disproportionation, condensation, decarboxylation, and aromatization. The nature, rates, and yields of these reactions go far beyond what can be achieved in other aqueous systems, including liquid water under "normal" conditions, aqueous systems at very high pressure (but sub-critical temperature), and superheated steam (below critical pressure). The possible reactions can also go far beyond what can be achieved without catalysts in other supercritical fluids, such as supercritical carbon dioxide. In a typical supercritical carbon dioxide process, the carbon dioxide usually acts as a solvent to extract one or more compounds; the prevalent process with supercritical carbon dioxide is typically extraction or solvation, not a chemical transformation.

U.S. Pat. No. 5,516,952 discloses a process for breaking down natural, synthetic, vulcanized, and non-vulcanized rubbers by selective oxidation in supercritical or near-critical water with an oxidant such as air, oxygen, or other oxidizing agent. Typical products were said to include alkanes, alkenes, dienes, aromatics, alcohols, carboxylic acids, aldehydes, and ketones, all preferably having from about 3 to about 8 carbon atoms, as well as carbon dioxide, water, and halide acids.

U.S. Pat. No. 5,830,763 discloses a process for the preparation of organic and inorganic deuterium-tagged compounds by heating with deuterium oxide under supercritical conditions. See also T. Junk et al., "Synthesis of polydeuterated benzothiazoles via supercritical deuteration of anilines," *J. Labelled Compounds and Radiopharmaceuticals*, vol. 39, pp. 625-630 (1997); and T. Junk et al., "Preparative supercritical deuterium exchange in arenes and heteroarenes," *Tetrahedron Letters*, vol. 37, pp. 3445-3448 (1996); and T. Junk et al., "Hydrogen isotope exchange reactions involving C-H (D, T)," *Chem. Soc. Rev.*, vol. 26, pp. 401-406 (1997).

Reactions of biomass in supercritical water in anaerobic or hypoxic conditions, and reactions under reducing conditions, give rise to volatile and semivolatile hydrocarbon assemblages in a matter of minutes or hours with good yields. Proteins, lipids, starch, cellulose, chitin, diatom cells, spent bacterial cultures, DNA, lignin, and humic acid are transformed to complex volatile and semivolatile hydrocarbon mixtures in supercritical water. Product mixtures contain linear and branched hydrocarbons, cycloalkanes, monoaromatics (e.g., benzene, phenol), PAHs (e.g., naphthalene, phenanthrene, pyrene), heteroarenes (e.g., dibenzofuran, dibenzodioxin, dibenzopyran) and their $C_1$-$C_5$ alkyl homologs. Other products include gases ($CO_2$, $CH_4$), asphaltics, and carbonized particulate residues in minor amounts. The major variables that have been examined most exhaustively in anoxic/reducing supercritical treatments have been temperature and duration of treatment. The rate of hydrocarbon formation, and the degree of mineralization and carbonization generally increase as temperature increases, or as treatment time increases. Reactions that have been observed in near-critical water after 24 hours have been observed in supercritical water after only 6 hours or less. Other factors that influence hydrocarbon concentration and composition are the elemental composition and molecular structure of the starting materials, pH, and the presence and identity of co-reactants in the reaction mixture (e.g., metals, reducing agents). See U.S. Pat. No. 6,180,845.

U.S. Pat. No. 5,364,475 discloses a process for removing pentachlorophenol or other non-ionic biocides from wood with supercritical fluids, with or without modifiers. Examples of supercritical fluids said to be usable in the process were nitrogen, nitrous oxide, carbon dioxide, and light hydrocarbons, with carbon dioxide being preferred. The "modifiers" were cosolvents that could be used together with the supercritical fluid in the range from 1 to 10 percent by weight, such as alcohols, ketones, and other low-boiling point organic solvents, with the preferred modifier being methanol.

U.S. Pat. No. 5,476,975 discloses a process for extracting contaminants from wood, such as pentachlorophenol, polychlorinated dibenzo-p-dioxins, and polychlorinated dibenzofurans by extraction with a supercritical fluid such as carbon dioxide; an "entrainer" having wood swelling properties such as water, methanol, ethanol, propanol, isopropanol, toluene, acetone, tetrahydrofuran, dimethylformamide, or dimethylsulfoxide; to break the hydrogen bond between the contaminants and the wood; at conventional supercritical fluid extraction temperatures and pressures; to extract the contaminants from the wood.

U.S. Pat. No. 6,001,256 discloses a method for selectively removing certain contaminants from certain solid or semi-solid materials, for example, removing PAHs or PCBs from soil, using subcritical water at a temperature between 100° C. and 374° C., while maintaining sufficient pressure to maintain the water in a liquid state.

R. Zapf-Gilje et al., "Overview of the remediation process at sites with creosote related contamination in soil, groundwater and river sediment," *Can. J. Civ. Eng.*, vol. 28 (Suppl. 1), pp. 141-154 (2001) describes the use of different methods to partially remediate sites contaminated with creosote in the Fraser River Delta in British Columbia.

W. Catallo, "Transformation of N-, O-, and S-heterocycles (NOSHs) in estuarine sediments: Effects of redox potential and sediment particle size," *Chemosphere*, vol. 33, pp. 2543-2563 (1996) describes the transformation of N-, O-, and S-heterocycles in sediments under reductive and oxidative conditions.

W. Catallo, "Effects of hydrological conditions on biogeochemical processes and organic pollutant degradation in salt marsh sediments," pp. 30-38 in M. Holland et al. (Eds.), *Proceedings of a Conference on Sustainability of Wetlands and Water Resources* (Asheville, N.C 2002) discusses the influence of tidal and static hydrological conditions, and their differing redox potentials, on biogeochemical processes and the transformation of pollutant organic chemicals such as NOSHs.

S. Kumar et al., "Effect of fatty acid removal on treatability of Douglas fir," International Research Group on Wood Preservation, Section 4, IRG Secretariat (Stockholm), Document No.: IRG/WP (93-40008) (1992?—undated) suggested that the removal of fatty acids from Douglas fir might improve the treatment of the wood by chromated copper arsenate. The removal of fatty acids was accomplished by extraction with supercritical carbon dioxide, using either methanol or methanol-formic acid as a cosolvent.

R. Portier et al., "Recovery of wood fiber from treated wood products by combined physical, chemical, and biological approaches," undated manuscript (199?) describes a combined physical, chemical, and microbial method for removing creosote and pentachlorophenol from treated wood by chipping the wood, chemically extracting the wood chips, and using microbes to digest the remaining PAHs in the wood chips.

M. Acda et al., "Effect of process variables on supercritical fluid impregnation of composites with tebuconazole," *Wood and Fiber Sci.*, vol. 29, pp. 282-290 (1997) discloses a study of the effects of pressure, temperature, and treatment time on impregnation of composites such as plywood, particleboard, flakewood, and medium-density fiberboard by supercritical carbon dioxide with methanol co-solvent to treat with the biocide tebuconazole. See also M. Acda et al., "Decay resistance of composites following supercritical fluid impregnation with tebuconazole," *Material und Organismen*, vol. 30, pp. 293-300

E. Demessie et al., "Supercritical carbon dioxide treatment: Effect of permeability of Douglas-fir heartwood," *Wood and Fiber Sci.*, vol. 27, pp. 296-300 (1995) discloses the use of supercritical carbon dioxide, alone or amended with methanol, to increase the permeability of Douglas fir.

M. Freeman et al., "Pilot-scale toxics R&D assessment of creosote-treated and PCP-treated wood cofiring for pulverized coal utility boiler applications," *Biomass & Bioenergy*, vol. 19, pp. 447-456 (2000) disclosed a process in which pentachlorophenol- or creosote-treated wood was combusted with coal at levels up to 10% heat input, without increases in air toxic emissions as compared to baseline eastern bituminous coal.

B. Falk, "Wood recycling," *Forest Prod. J.*, vol. 47, no. 6, pp. 17-22 (1997); and C. Felton et al., "The recycling potential of preservative-treated wood," *Forest Prod. J..*, vol. 46, no. 7/8, pp. 37-46 (1996) give an overview of the extent and potential scope of recycling wood waste, including treated wood waste. See also P. Cooper, "Management of used poles removed from service," *Proc. Second Southeastern Pole Conference*, pp. 102-112 (Jan. 22-25, 1996); and P. Cooper et al., "Residual CCA levels in CCA-treated poles removed from service," *Solid Wood Prod.*, vol. 51, no. 10, pp. 58-62 (2001).

Weathered creosote differs from fresh creosote primarily in the loss of the lighter, semivolatile components. These lighter components are believed to be more important for the preservative or biocidal properties of creosote, although the heavier components may also play a role, such as solvating the lighter components to reduce the leaching of the latter, and perhaps a role in mechanical properties as well.

I have discovered an environmentally-friendly method for transforming treated wood, including creosote-treated and CCA-treated wood. This invention provides, for example, an environmentally-friendly method for transforming weathered, creosote-treated wood into a mixture that is similar to fresh creosote by treatment with supercritical water. The novel system is akin to a closed-loop system for recovering and rejuvenating creosote.

Following supercritical water treatment of weathered, creosote-treated wood, the creosote-derived hydrocarbon residues that still remain in the wood are largely recovered. However, the wood itself is transformed into a mixture of semivolatile hydrocarbons, including substituted and unsubstituted benzenes, phenols, and light polyaromatic hydrocarbons. Serendipitously, it was discovered that the composition of the wood-derived transformation products is such that those products "reconstitute" the "light end" of the creosote, those semivolatile compounds that are largely lost through weathering in service by processes such as volatilization, photolysis, and solubilization. Thus, the hazardous waste materials (the weathered creosote components) are recovered, and the solid waste material (the wood) is transformed into a complimentary product mixture of semivolatiles to "reconstitute" the creosote, all in one pass.

It is preferred that hypoxic-anoxic and reducing conditions be used—i.e., it is preferred that the conditions be essentially anoxic, and that oxidizing agents should be substantially excluded from the reaction mixture. Optionally, strong reducing agents or other co-reactants may be added to the reaction mixture to tailor product distributions. Such optional additional agents orco-reactants may include, for example, reduced metal such as iron, nickel, or copper; $H_2$ gas; and $Na_2H_2BO_4$ powder; inert substances (e.g., Ar), a base, or an acid. Using anoxic or near-anoxic conditions minimizes the conversion of carbon to carbon dioxide. Ar or other inert gases may be used to facilitate deoxygenation of the systems, and may be recovered and purified for reuse. Use of a metal reaction vessel may itself also be a source of reducing agents.

A major advantage of this invention is that very little solid or water-soluble residue remains after the supercritical treatment. The novel process allows the almost complete recovery of chemical wastes, and can substantially reduce the volume of decommissioned creosote-treated wood that would otherwise be sent to landfills, or that would be treated in other systems that do not produce a "reconstituted" creosote—e.g., incineration, which produces ash, $CO_2$, hazardous respirable pollutant mixtures, and typically little recyclable output.

In another aspect of this invention, I have discovered that anoxic (or reductive), acidic, supercritical water (i.e., pH about 6.5 or less, preferably about 4.0 or less, more preferably about 2.0 or less, most preferably about 1.0 or less) will efficiently extract metallic contaminants from treated wood (such as CCA-treated wood) which is transformed into an oily liquid as the wood matrix is destroyed. No prior work known to the inventor has been reported concerning reactions in anoxic (or reductive), strongly acidic, supercritical water. More generally, this aspect of the invention may be used to remove metals from a liquid or solid organic matrix (including a slurry). Following supercritical water treatment, the matrix itself is substantially removed, thereby avoiding the problems prior acid washing approaches have encountered with residual metal in the matrix.

Note: Since the pH of a supercritical fluid may not be a precisely-defined concept, and since it would be difficult to measure directly in any event, unless context clearly indicates otherwise, as used in the specification and claims the "pH" of a supercritical aqueous phase is simply considered to be the same as the measured or calculated pH of the starting aqueous phase at 1 atmosphere and 25° C. prior to being raised to supercritical conditions.

EXAMPLES

Materials and Methods

A typical weathered, decommissioned, creosote-treated, southern yellow pine (Pinus sp.) utility pole, about fifteen years old, was selected for prototype creosote treatment. (For the prototype CCA treatment, a 12-year-old CCA-treated southern yellow pine guardrail was used.) A one-foot section was cut from the appropriate wood sample. This sample represented the above-ground or otherwise exposed wood from each structure. The sections were weighed, and ground in a Wiley™ mill into fine particles that passed a 1 mm mesh screen. Weighed particle samples were added to a 65 mL high pressure autoclave in the presence of water above pH 10. The suspension was sparged with Ar for 1 hour, sealed, and heated to 400±10° C. at 300 bar for 12-20 hours (including heat-up and cool-down time).

Fresh creosote was obtained commercially (Kopper Industries, Inc., Pittsburgh Penn.), diluted to appropriate levels with dry dichloromethane (DCM), and analyzed by gas chromatography-mass spectrometry.

Sub-samples of the milled, decommissioned utility pole wood were weighed into cellulose thimbles (Whatman, Springfield Mill, UK; 10×50 mm) and micro-Soxhlet extracted with ether to obtain a sample of weathered creosote for analysis. The resulting extract was dried over anhydrous sodium sulfate.

Following supercritical treatment, the contents of the reactors were vacuum-filtered using pre-weighed membranes, and filtrates were liquid-liquid extracted with ether in separatory funnels. The ether phase was collected and dried over anhydrous sodium sulfate, followed by gas chromatography-mass spectrometry (GC-MS) analysis.

GC-MS: Shimadzu QP500 GC-MS; DB 5 capillary column (30 m; 0.25 mm id; 0.25 µm film); injector 250° C.; temperature program 50° C. (4 min), ramp 4° C. per minute to 250° C. (10 min); sampling rate 2 Hz; mass acquisition range 50-300 amu in the full scan mode. Analyte transfer to the mass spectrometer source occurred at 280° C. Target ions spanned the molecular weight range between benzene (78 amu) and coronene (300 amu). Product identification was performed by: (a) comparison of experimental data with known standards, (b) interpretation of mass spectra (molecular ions, isotopic structures, and logical fragment losses), and (c) comparison of spectra with computerized libraries of mass spectra. Mass spectra were considered acceptable if the signal-to-noise ratio for the base peak of interest was at least 3, and if there was minimal background interference for isotopic clusters and fragments. MS calibration with perfluorotributylamine was performed at least daily, and all MS analyses were conducted under the same calibration to enhance the validity of comparisons. Digital background subtraction and chromatographic overlay algorithms were used for further evaluation of GC-MS data from standards and extracts.

Results and Discussion

Figure 1:
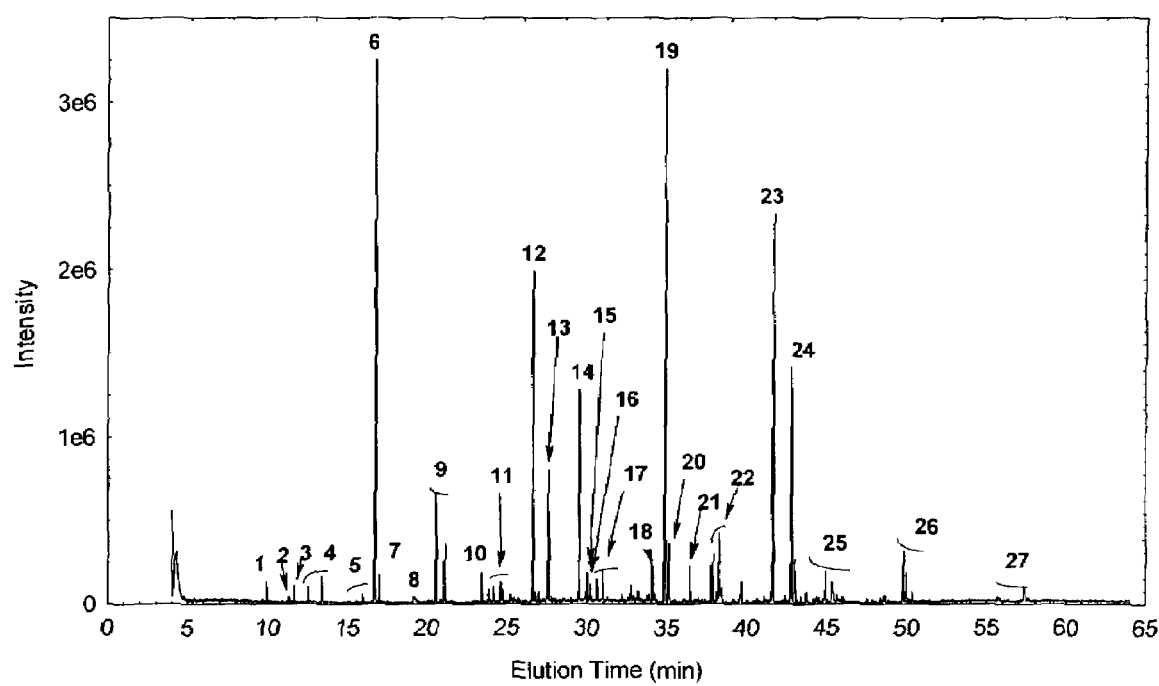
FIG. 1 depicts a total ion chromatogram (TIC) of semivolatile AHs, PAHs and NOSHs from a fresh creosote sample.

FIG. 1 depicts a total ion chromatogram (TIC) of semivolatile AHs, PAHs and NOSHs from a fresh creosote sample. The fresh creosote contained a complex array of semivolatile aromatic and heterocyclic compounds, with resolved compounds spanning the molecular weight range 94 through 252 (e.g., phenol through the benzofluoranthene/benzopyrene isomers). Looking specifically at elution times less than 25 minutes, there were substantial amounts of phenol, indene, naphthalene, quinoline, biphenyl, and their $C_1$ and $C_2$ alkyl homologs. Compounds eluting after 25 minutes included 3-5 ring PAHs and NOSH compounds such as fluorene, dibenzothiophene, dibenzofuran, phenanthrene, pyrene, carbazole, isomers of benzofluorene (216 amu), triphenylene/benzanthrance/chrysene (226 amu) and benzofluoranthene/benzopyrene isomers (252 amu).

Key to the inferred identities of the numbered TIC peaks in FIG. 1 for fresh creosote: 1. Phenol. 2. 2,3-Dihydro-1H-indene. 3. 1-H-indene. 4. $C_1$-Phenols (2 isomers). 5. $C_2$-Phenols (3 isomers). 6. Naphthalene. 7. Benzo(b)thiophene. 8. Quinoline. 9. $C_1$-Naphthalenes. 10. Biphenyl. 11. $C_2$-Naphthalenes (4 isomers). 12. Acenaphthylene. 13. Dibenzofuran. 14. Fluorene. 15. $C_3$-Naphthalenes (3 isomers). 16. $C_1$-Biphenyl. 17. $C_1$-Dibenzofurans (2 isomers). 18. Dibenzothiophene. 19. Phenanthrene. 20. Anthracene. 21. Carbazole. 22. $C_1$-Phenanthrenes (4 isomers). 23. Fluoranthene. 24. Pyrene. 25. Benzofluorenes (3 isomers). 26. Triphenylene/Benzanthracene/Chrysene (2 isomers). 27. Benzofluoranthenes/Benzopyrenes (4 isomers).

Figure 2:
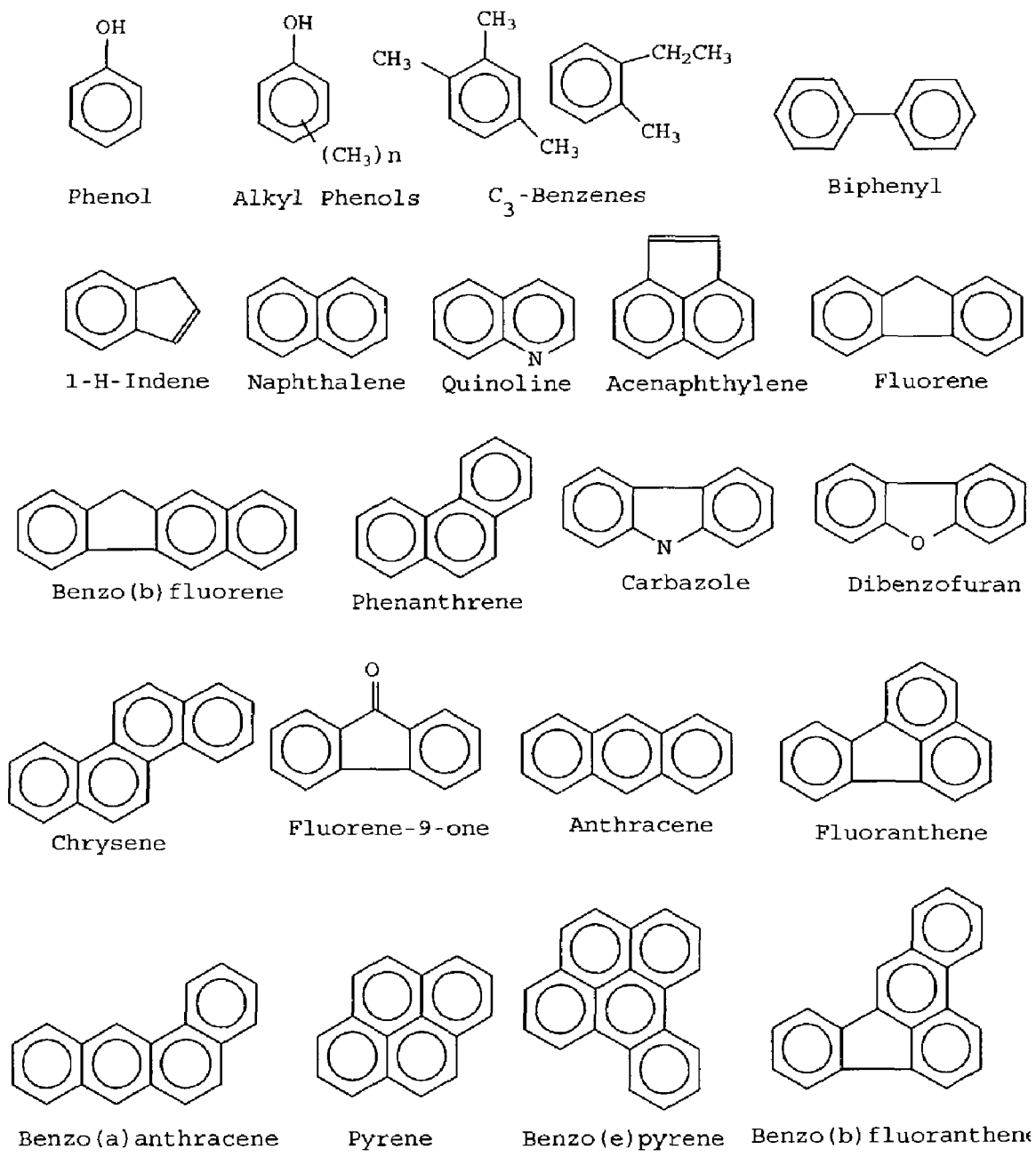
FIG. 2 depicts structures of selected components of fresh creosote, as well as some from the supercritical water-treated decommissioned utility pole wood.

The structures of selected components of fresh creosote, as well as some from the supercritical water-treated decommissioned utility pole wood, are illustrated in FIG. 2.

Figure 3:
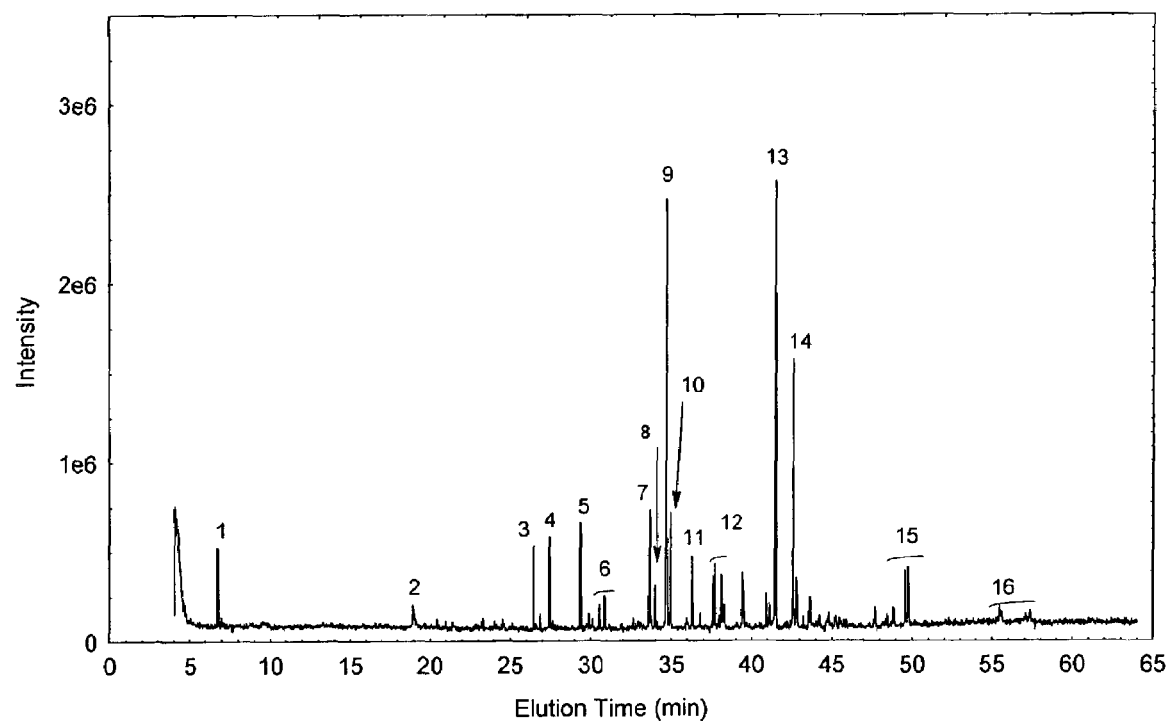
FIG. 3 depicts a TIC of weathered creosote recovered from the decommissioned wood pole material by solvent extraction.

FIG. 3 depicts a TIC of weathered creosote recovered from the decommissioned wood pole material by solvent extraction. It can been seen that, with the exception of a chlorinated material that eluted around 7 minutes (tetrachloroethane), and a small residue of quinoline around 19 minutes (129 amu), the light, semivolatile components of the creosote (i.e., those compounds eluting before 25 minutes) were substantially lost or depleted from the decommissioned pole. This was very clearly seen, for example, for naphthalene, which was the most abundant light, semivolatile compound in fresh creosote (FIG. 1), but was substantially absent from the weathered material. Other compounds found in the fresh creosote but not in the weathered creosote included phenol, benzothiophene, and biphenyl; as well as several alkyl homologs of these compounds. The loss of the light, semivolatile aromatic and heterocyclic compounds presumably reflects leaching or other reactions in situ (e.g., photochemical degradation); the loss of such compounds is known to reduce the desirable biological and chemical preservative properties of the wood. Nevertheless, many toxic and carcinogenic compounds still remained in the wood after decommissioning, as evidenced by the compounds that eluted after 26 minutes, including dibenzofuran, phenanthrene, fluoranthene/pyrene, and benzofluoranthenes. Interestingly, the ratios of these nonvolatile compounds to one another in the weathered sample were close to the ratios observed in the fresh creosote, illustrating the lack of pronounced weathering of these relatively nonvolatile and water-insoluble compounds.

Key to the inferred identities of the numbered TIC peaks in FIG. 3 for weathered creosote extracted from decommissioned utility pole wood: 1. Tetrachloroethane (1 isomer). 2. Quinoline. 3. Acenaphthylene. 4. Dibenzofuran. 5. Fluorene. 6. $C_1$-Dibenzofurans (2 isomers). 7. Fluorene-9-one. 8. Dibenzothiophene. 9. Phenanthrene. 10. Anthracene. 11. Carbazole. 12. $C_1$-Phenanthrenes (4 isomers). 13. Fluoranthene. 14. Pyrene. 15. Triphenylene/Benzanthracene/Chrysene (2 isomers). 16. Benzofluoranthenes/Benzopyrenes (4 isomers).

Figure 4:
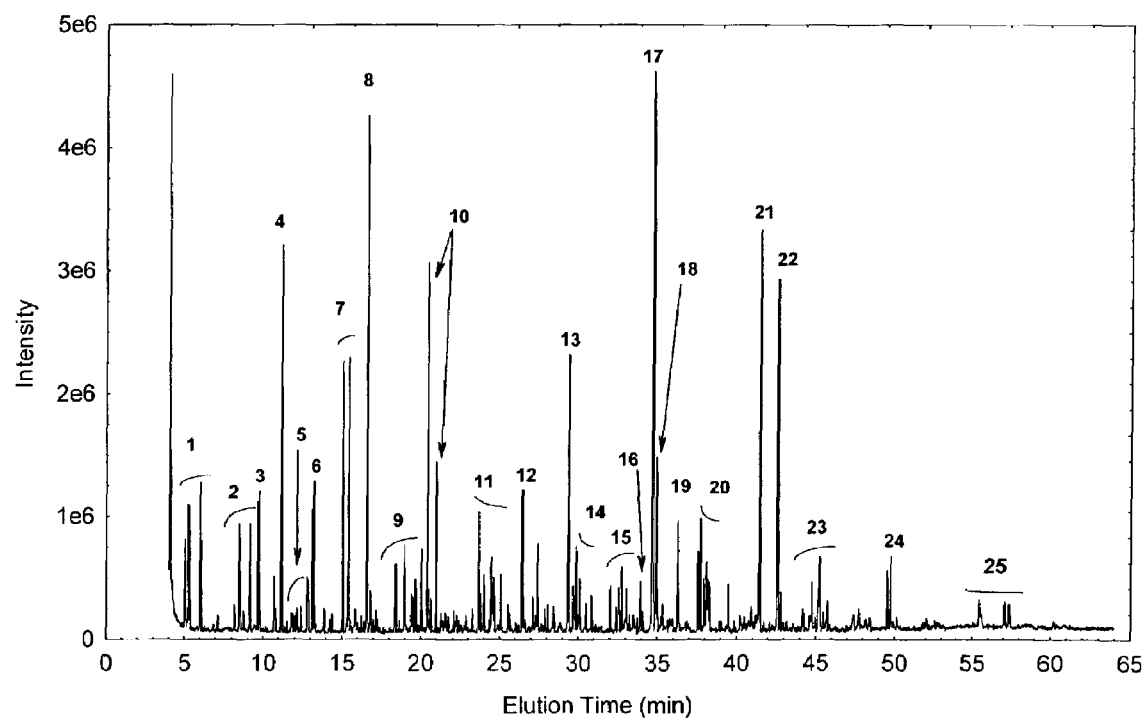
FIG. 4 depicts a TIC of the nonpolar liquid residue that was generated by supercritical water treatment of the decommissioned utility pole wood.

FIG. 4 shows a TIC of the nonpolar liquid residue that was generated by supercritical water treatment of the decommissioned utility pole wood. The wood particles subjected to supercritical treatment were degraded and transformed to semivolatile hydrocarbons and related compounds (e.g., benzene, phenol, indene, and their alkyl homologs). The efficiency of the conversion of wood to hydrocarbon was about 98-99+% (w/w). I.e., solid residues were less than 2% w/w. Depending on reaction conditions and starting materials, solid residues might be as high as 5% or 10%, but should preferably be 2% or less. Thus the resulting post-supercritical treatment mixture was no longer a suspension of particles, but rather was a biphasic system of polar (water) and nonpolar (oil) liquids, with the wood solids almost completely transformed to a mixture of liquid hydrocarbons. In addition to monoaromatic compounds and their alkylated homologs mentioned above, the supercritical water treatment of the decommissioned pole material actually replaced substantial amounts of the phenol, naphthalene, and their $C_1$ and $C_2$ alkyl homologs that were prominent in fresh creosote, but that were lost from the weathered creosote to the environment. Further, chlorinated additives found in the weathered creosote (e.g., tetrachlorethane, pentachlorophenol) had been degraded, and the PAH and NOSH compounds eluting after 25 minutes in the SC treatment were virtually identical to the fresh and weathered creosote samples: thus the residual creosote in the pole wood was recovered. Thus this process takes what would otherwise be hazardous waste, with the potential to contaminate landfills, and regenerates a new product that is chemically very similar to fresh creosote, and that may be used in place of creosote to inhibit decay in newly-manufactured utility poles, railroad ties, marine structures, and the like.

Thus, following the supercritical treatment, there is an aqueous phase and a nonpolar phase. The nonpolar phase is essentially similar to creosote, and requires only minor further processing (e.g., de-watering, distilling) before it may used as a wood preservative. Although the components of the aqueous phase have not yet been fully characterized, the aqueous phase is expected not to require significant further processing before it may be safely discharged or recycled. The relatively low amount of solidified, carbonized residue might be used, for example, as a component in a cement. Thus the present invention transforms a hazardous waste material into a usable product. This approach has the dual advantages of not having an appreciable output of $CO_2$ into the atmosphere, and of reducing the consumption of coal and coal chemicals to manufacture wood preservatives.

Key to the inferred identities of the numbered TIC peaks in FIG. 4 for decommissioned utility pole wood after treatment in supercritical water for 12 hours: 1. $C_2$-Benzenes (3 isomers). 2. $C_3$-Benzenes (5 isomers). 3. Phenol. 4. 1-H-Indene. 5. $C_4$-Benzenes (4 isomers). 6. $C_1$-Phenol. 7. $C_1$-Indene. 8. Naphthalene. 9. $C_2$-Indenes (3 isomers). 10. $C_1$-Naphthalenes (2 isomers). 11. $C_2$-Naphthalenes (4 isomers). 12. Acenaphthylene. 13. Fluorene. 14. $C_1$-Biphenyls (2 isomers). 15. $C_1$-Fluorenes. 16. Dibenzothiophene. 17. Phenanthrene. 18. Anthracene. 19. Carbazole. 20. $C_1$-Phenanthrenes (4 isomers). 21. Fluoranthene. 22. Pyrene. 23. Benzofluorenes (3 isomers). 24. Triphenylene/Benzanthracene/Chrysene (2 isomers). 25. Benzofluoranthenes/Benzopyrenes (4 isomers).

The table below gives a comparison of selected components of fresh creosote, weathered creosote, and reconstituted creosote prepared by the supercritical water treatment of a decommissioned, creosote-treated, pine utility pole in accordance with the present invention. Note the similarity in composition of the fresh creosote and reconstituted creosote, and the differences between both and weathered creosote.

| COMPOUND | Fresh Creosote | Weathered Creosote | "Reconstituted" Creosote |
|---|---|---|---|
| Tetrachloroethane | nd | + * | nd ** |
| Benzenes (C2) | nd | nd | + |
| Benzenes (C3) | nd | nd | + |
| Phenol | + | nd | + |
| Phenol (C1) | + | nd | + |
| Phenols (C2) | + | nd | + |
| 1-H-Indene | + | nd | + |
| Indenes (C1) | nd | nd | + |
| Indenes (C2) | nd | nd | + |
| Naphthalene | + | nd | + |
| Benzo(b)thiophene | + | nd | + |
| Quinoline | + | + | + |
| Naphthalene (C1) | + | nd | + |
| Naphthalene (C2) | + | + | + |
| Acenaphthalene | + | + | + |
| Fluorene | + | + | + |
| Biphenyl | + | nd | + |
| Biphenyl (C1) | + | nd | + |
| Fluorenes (C1) | nd | nd | + |
| Dibenzothiophene | + | + | + |
| Phenanthrene | + | + | + |
| Anthracene | + | + | + |
| Carbazole | + | + | + |
| Phenanthrenes (C1) | + | + | + |
| Fluoranthene | + | + | + |
| Pyrene | + | + | + |
| Benzofluorenes | + | + | + |
| Chrysene & isomers | + | + | + |
| m/z 252 isomers | + | + | + | nd = "not detected" at 5 ppm or above.
+ = at least one isomer detected at 5 ppm or above
* Assumed to have been added at the time of pole treatment; but not in the commercial standard creosote tested.
** Dechlorinated in supercritical phase.

Recalling that different creosotes have different compositions, the "reconstituted" creosote was probably even more similar to other creosote mixtures than the particular fresh creosote reported above. See C. Rostad et al., "Bonded-phase extraction column isolation of organic compounds in groundwater at a hazardous waste site," *Anal. Chem.*, vol. 56, pp. 2856-2860 (1984).

Surprisingly, the product mixture resulting from supercritical water treatment of creosote-impregnated wood is different from what one would expect merely by adding together the product mixture from supercritical water treatment of wood alone, with the product mixture from treatment of creosote alone. For example, there is evidence that the undesirable products dibenzofurans, benzopyrans, and dioxins are decreased in the creosote-wood SC product mix as compared to that resulting from SC treatment of wood only. (Note: no significant amount of halogenated dioxins are observed in the products resulting from SC treatment of any of these starting materials. The reference to "dioxins" refers to, e.g., dibenzo-p-dioxin, with no substantial degree of halogen substituents.)

This process may be applied in batch, continuous flow-through, or "pulsed" mode. The compositions resulting from these three types of processes may show differences from one another.

In a prototype demonstration for converting CCA-treated wood with acidic, supercritical water, a sample of wood was taken from a new, commercially produced, CCA-treated yellow pine plank. The CCA-treated wood was ground in a ball mill into a coarse powder, and was then sieved through a 1 mm screen. The sieved powder was extracted and analyzed to determine metal content per gram in the starting material, using a standard, hot nitric acid analysis. The total metal concentrations in the wood prior to treatment, expressed as means of duplicate analyses plus or minus standard deviations, in parts per million by weight, were: Cu, 1064±37; Cr, 1644±37; and As, 1458±38.

The milled wood was weighed into Ti autoclaves, to which was added water that had been made highly acidic with concentrated HCl (7 parts water, 1 part concentrated HCl by volume). HCl was chosen as the acid both because it is a strong acid, and because it was thought likely that it would help to complex or precipitate free metal cations as insoluble chloride salts after treatment. The reactor was subjected to acidic, anoxic (reductive), supercritical water treatment at 400° C. and 250-280 bar for 12 hours, including warm up and cool down (approximately 3.5 hours total heating and cooling periods). Optionally, the pH may be raised following the reaction to better precipitate metal chloride salts.

The CCA-treated wood was transformed in the acidic, supercritical water to a hydrocarbon mixture (about 45% yield, on a weight basis of the oily liquid). The resulting biphasic mixture (oil and water) was separated with a separatory funnel. The wood itself was >98% transformed into non-particulate (oil) residue. No steps were taken to further dewater the oily liquid.

The pre-weighed oily liquid was slowly evaporated under normal atmosphere to a tarry consistency. It was then digested with a hot, concentrated mixture of nitric and hydrochloric acids, and was then analyzed for metal concentrations using inductively-coupled argon plasma emission spectrometry (ICAP). The acidified water was analyzed directly by ICAP. The results of this analysis were as follows, expressed as percentages of total metal from the starting material recovered in each of the phases:

Copper: 91% in aqueous phase; <1% in hydrocarbon phase
Zinc: 83% in aqueous phase; 1.5% in hydrocarbon phase
Chromium (primarily Cr (VI)): 28% in aqueous phase; 1.3% in hydrocarbon phase
Arsenic: 69% in aqueous phase;1% in hydrocarbon phase (The observed zinc was presumably derived from the wood itself.)

An analysis of the reactor wall for the "missing metals" (i.e., those not recovered in either the aqueous or organic phases following treatment) gave the following measurements in ppm for a 65 mL sample extracted at pH<2: Cu, 88.5; Cr, 0.24; As, 4.96. The results to date do not provide a mass balance for chromium; additional experiments will be conducted to determine where this metal is being sequestered. Without wishing to be bound by this theory, it is believed that the "missing metals" likely remain plated out on the reactor wall, and simply have not been extracted from the wall under the acid extraction conditions that have been used to date. In larger-scale operations, if the amount of metal adsorbed onto the reactor walls becomes too great, the metals could always be un-plated and recovered by reaction with an aqueous acid solution.

The majority of the CCA metals were sequestered either in the acidified water or as insoluble precipitate on the reactor surfaces. Less than 2% of the metals partitioned with the oily liquid phase. Further treatments to collect the metals might include volume reduction (evaporation of water), followed by precipitation or electrochemical recovery of metals. The oily liquid could be distilled to remove metals, or devices analogous to post-combustion scrubbers/converters could be used to capture any fugitive metals if the oily liquid were used as a fuel without distillation (e.g., in a tractor or a furnace).

Recovery of metals in this fashion may be conducted in the presence of a reducing agent such as elemental hydrogen, borohydride, or a reduced metal such as reduced copper. Care should always be taken in working with toxic compounds or toxic metals. Particular care should be taken when working with such reducing conditions, because $AsH_3$ or other reduced arsenicals in the gas phase are highly toxic.

A note regarding nomenclature: the element arsenic is chemically considered to be a semimetal. However, for simplicity of nomenclature, arsenic may sometimes be referred to as a "metal" in the present specification and claims, so that each of the major components of CCA (copper, chromium, and arsenic) may be simply called a "metal." The distinction between metals and semimetals, although important in other contexts, is not particularly important in the context of the present invention.

Reaction variables in the practice of this invention that may be optimized through routine testing include shaking or stirring the reaction mixture, using a multi-reactor flow-through process, using co-reactants such as reduced metals or other reducing agents, changing the concentration of reactants, reacting under a hydrogen atmosphere, using thermal cycles, and using hot zone-cold zone fractionation.

As used in the specification and the claims, the term "essentially free of any strong oxidant" refers to reaction conditions that are devoid of oxygen or any other strong oxidizing agent, or to reaction conditions where the concentration of oxygen or any strong oxidizing agent that may be present is insufficient to alter substantially the composition of the products of the reaction as compared to the products of an otherwise identical reaction of starting materials that are otherwise identical, except that the starting materials are completely devoid of strong oxidizing agents.

As used in the specification and claims, "supercritical" conditions for water refer to reaction conditions where both the temperature is greater than 374.2° C. and the pressure is greater than 221 bar. As used in the specification and claims, "near critical" conditions for water refer to reaction conditions where both the temperature is greater than about 320° C. and the pressure is greater than about 200 bar.

As used in the specification and claims, a "reactor" for a process is any device or vessel that is supplied by the operator of the process, and in which the chemical reactions of the process may take place.

Partial disclosures of the present invention that were made within the twelve months preceding the filing date of this application were the following: (1) Inventor W. James Catallo presented a seminar at Louisiana State University on Feb. 25, 2002 presenting certain preliminary results of this work. No pertinent printed materials were distributed at this seminar. (2) On the inventor's personal page on the University department web page, http://svm470.vetmed.lsu.edu/, the following passage appeared from March 2002 through the filing date of the present application: "2002. Hydrothermal Aqueous Treatment of Coal and Petroleum Chemicals and Treated Wood Products: Complete Transformation and Recovery. United States Patent Pending. Use of supercritical water (see below U.S. Pat. No. 6,180,845) to completely transform creosote-treated wood products such as decommissioned utility poles. In this approach, the wood is transformed (98-99+%) to a mixture of light aromatics and residual creosote in the wood is recovered as part of the mixture. The transformed/recovered mixture is very similar in composition and behavior to a fresh (unweathered) creosote, and may be used as a commercial product. Thus the entire solid+hazardous waste problem presented by decommissioned creosote-treated wood (hundreds of millions of pounds annually) is solved in one pass, with the generation of a usable product."

The complete disclosures of all references cited in this specification are hereby incorporated by reference. Also incorporated by reference is the complete disclosure of the following manuscript: W. Catallo and T. Shupe, "Comprehensive Hydrothermal Treatment of Creosote-impregnated Wood" (accepted for publication in *Wood and Fiber Science*, 2003) In the event of an otherwise irreconcilable conflict, however, the present specification shall control.

I claim:

1. A process for removing at least one toxic metal from treated wood that contains one or more toxic metals; said process comprising reacting the treated wood with supercritical or near-critical water, at pH about 6.5 or less, under reaction conditions that are essentially free of any strong oxidant, for a time sufficient to substantially convert the organic portion of the wood into a hydrocarbon mixture, whereby, upon cooling, the resulting reaction products contain at least two substantially immiscible phases, a hydrocarbon phase and an aqueous phase; wherein said reacting is conducted for a time sufficient that 90% or more of at least one toxic metal is present in the aqueous phase, or 90% or more of such a toxic metal is present in a precipitate, or 90% or more of such a toxic metal is present in the aqueous phase and a precipitate combined.

2. A process as recited in claim 1, wherein said reacting step occurs in the presence of a noble gas.

3. A process as recited in claim 1, wherein said reacting step occurs in the presence of a reducing agent.

4. A process as recited in claim 1, wherein said reacting step occurs in the presence of elemental hydrogen.

5. A process as recited in claim 1, wherein said reacting step occurs in the presence of borohydride.

6. A process as recited in claim 1, wherein said reacting step occurs in the presence of at least one reduced metal.

7. A process as recited in claim 1, wherein said reacting step occurs in the presence of reduced copper.

8. A process as recited in claim 1, additionally comprising the step of recovering at least a portion of at least one metal from the aqueous phase or from a precipitate; by one or more of the following steps: precipitation from the aqueous phase; or electrolysis of the aqueous phase; or electrolysis of a precipitate; or evaporation of the aqueous phase; or distillation of the aqueous phase.

9. A process as recited in claim 1, wherein at least one toxic metal recovered by said process is selected from the group consisting of copper, chromium, and arsenic.

10. A process as recited in claim 1, wherein at least one toxic metal recovered by said process is selected from the group consisting of mercury and bismuth.

11. A process as recited in claim 1, wherein the treated wood comprises wood treated with chromated copper arsenate, and wherein at least one toxic metal recovered by said process is selected from the group consisting of copper, chromium, and arsenic.

12. A process as recited in claim 1, additionally comprising the step of recovering the hydrocarbon phase.

13. A process as recited in claim 1, wherein the pH is about 4 or less.

14. A process as recited in claim 1, wherein the pH is about 2 or less.

* * * * *